United States Patent [19]

Stolzer

[11] Patent Number: 4,488,847
[45] Date of Patent: Dec. 18, 1984

[54] APPARATUS FOR STORING ROD-SHAPED MATERIAL

[75] Inventor: Paul Stolzer, Achern, Fed. Rep. of Germany

[73] Assignee: KEURO Maschinenbau Gesellschaft mit beschränkter Haftung & Co. Kommanditgesellschaft, Achern, Fed. Rep. of Germany

[21] Appl. No.: 389,113

[22] Filed: Jun. 16, 1982

[30] Foreign Application Priority Data

Aug. 21, 1981 [DE] Fed. Rep. of Germany ....... 3133108

[51] Int. Cl.³ .............................................. B65G 1/04
[52] U.S. Cl. .................................. 414/222; 414/278; 414/281
[58] Field of Search ............... 414/222, 267, 278, 281, 414/276

[56] References Cited
U.S. PATENT DOCUMENTS
2,624,470 1/1953 Geist ................................ 414/281 X FOREIGN PATENT DOCUMENTS
2925469 1/1981 Fed. Rep. of Germany .

Primary Examiner—Robert G. Sheridan
Attorney, Agent, or Firm—Spencer & Frank

[57] ABSTRACT

An apparatus for storing and supplying rod-shaped material to a cutting machine comprising a shelving unit including a plurality of carrier arms arranged one above another to form shelving compartments for holding rod-shaped material. A first rotatable rollway is located in the shelving unit and forms a substantially horizontal support for delivering and returning rod-shaped material to and from the cutting machine. The first rollway is vertically displaceable from a cutting machine loading position to a supplying position. A crane bridge is provided moveable with respect to the shelving unit for moving rod-shaped material from the shelving compartments to the first rollway. A second rotatable rollway is provided to form an additional substantially horizontal support for delivering and returning rod-shaped material to and from the cutting machine and the second rollway is also vertically displaceable between a supply position and a cutting machine loading position.

4 Claims, 1 Drawing Figure

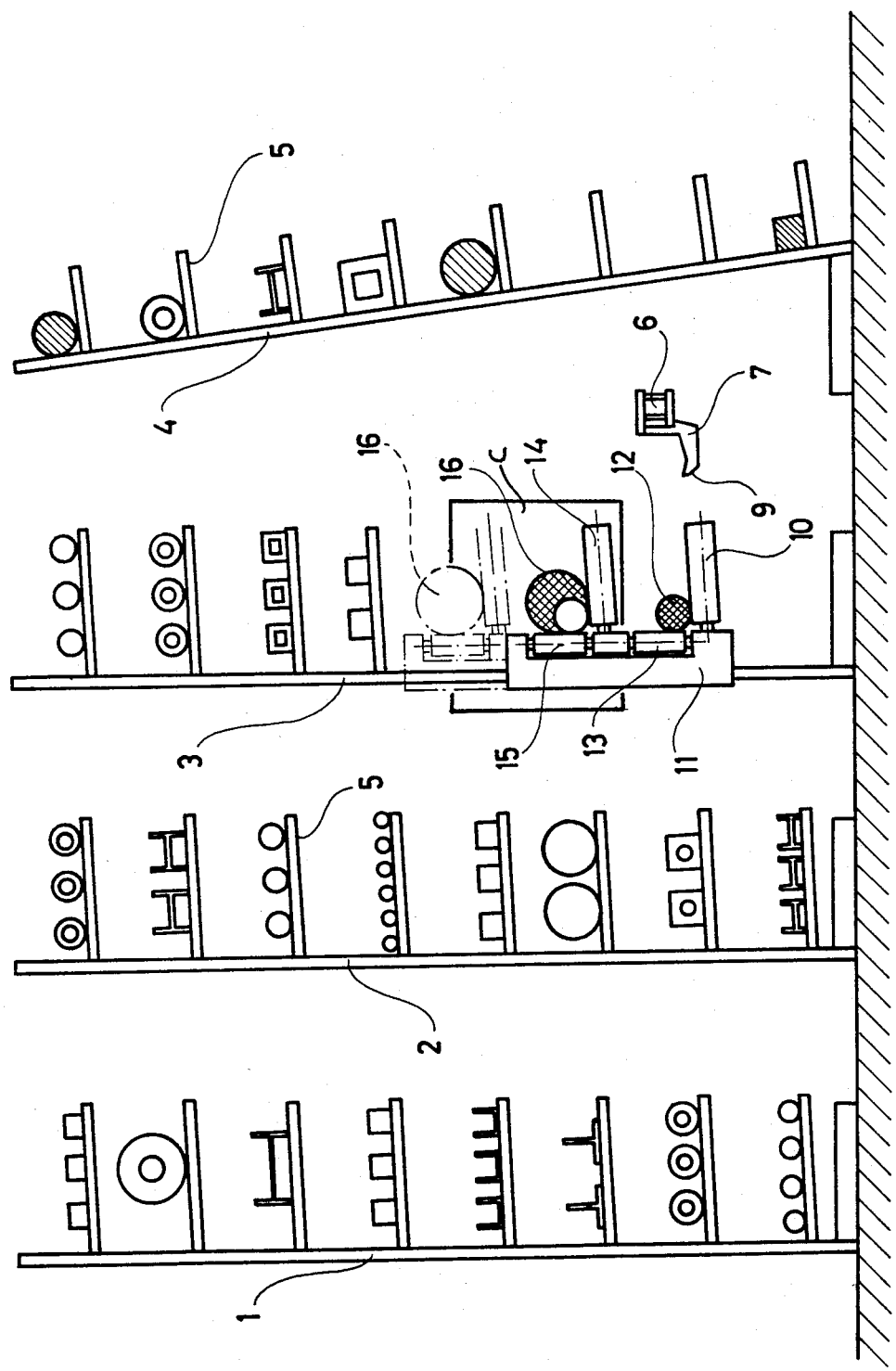

APPARATUS FOR STORING ROD-SHAPED MATERIAL

BACKGROUND OF THE INVENTION

The invention relates to an apparatus for the storage of material in rod form and is particularly adapted for an automatic, program-controlled, supply of material to a cutting machine.

Apparatus of this type comprises a plurality of shelving units arranged side by side, transversely of the longitudinal direction of the material to be stored on the shelving units. Each shelving unit includes shelving compartments formed of carrier arms and arranged one above the other. Each shelving compartment is intended to have one kind of material and diameter stored therein. A crane bridge is provided which is moveable over the shelving units, transversely of the gangways between the shelving units and vertically in the gangways with means for taking the material from the shelving compartments, transporting it and redepositing it in the shelving unit compartments. A rollway occupying the position of one shelving compartment and forming a substantially horizontal support, is drivable in both directions of rotation for feeding the material, deposited on it, to the cutting machine and for returning the material from the cutting machine after it has been worked on. The cutting machine is arranged in the longitudinal direction of the material to be cut outside the region occupied by the shelving units. The rollway is displaceable, for material exchange, vertically downwards out of its position for feeding the material to the cutting machine. Over the shelving components above the rollway a space for a further shelving component is left free to permit the exchange of material. The crane bridge is moveable between the carrier arms of the shelving compartments and the rollers of the rollway to take up material.

Such an apparatus is known from German Pat. No. 2,925,469. There the crane bridge, having a means for taking up the material, holds the material next to be worked on ready in the free compartment above the rollway, while the previously worked material is laid, by lowering of the rollway, onto a transfer truck which then brings the material in the horizontal direction into the region of the gangway. The rollway then returns to its normal working position where the material next to be worked on is loaded on the rollway by the crane bridge. Thereafter, the rollway feeds the material to the cutting machine for working, while the crane bridge, moving downwards in the shelving gangway, takes up the previously worked material from the transfer truck and returns it to its storage position, in order then to bring the material which is now to be worked next and hold it ready again in the free compartment situated above the rollway.

The above arrangement substantially reduces the change times between the worked material and the material to be worked on next, as compared to the change times required therebefore. At the same time the apparatus is lightweight and simple to install. Although the prior art has, to a degree, succeeded, especially in improving the change times, nonetheless the prior art requires additional apparatus which require additional space, not only beneath the rollway, but also in the direction towards the shelving gangway, and are correspondingly expensive to construct.

SUMMARY OF THE INVENTION

It is an object of the present invention to modify the above-stated prior art apparatus to save further material transfer time to a significant extent, yet provide an apparatus which is substantially simplified in construction, utilizes less movement space and is inexpensive. Components already present in prior art rollways are used extensively, with minor modification or complementation.

This object and others to become apparent as the specification progresses, are accomplished by the invention, according to which, briefly stated, a second rollway positioned above the first rollway and occupying the space of a shelving compartment is provided. The second rollway forms a substantially horizontal support and is provided with rollers drivable in both directions of rotation. A crane bridge is provided for taking up the material. The second rollway is displaceable vertically with the first rollway to the position in which material to the cutting machine is supplied.

In accordance with the invention, the first and second rollways may utilize the same guide carriage so that they may be vertically displaceable together. The two rollways are arranged one above the other, to function as transfer station where material next to be worked on can be loaded for delivery to the cutting machine and unloaded after it has returned from the cutting machine. At each point in time one rollway which is above or below the rollway which at that time supports material then being worked on is available for receiving material from or releasing material to the crane bridge.

The transfer station of the present invention practically requires only a second rollway within the shelving unit region. The second rollway does not have an additional space requirement, since the transfer station of the invention moves within the region which, in the prior art, was occupied by the free compartment on the one hand and the transfer truck held ready beneath the rollway on the other hand. Thus, the present invention does not require additional space in the region towards the shelving gangway. By virtue of the invention, the transfer truck required by the prior art along with the guides on the floor necessary for the transfer truck and the drive and control means necessary for the movement of the transfer truck are eliminated. Since the movement of one rollway necessary to deliver material to the cutting position requires a corresponding movement of the other rollway, the rollways are, in a preferred embodiment, vertically displaceable by means of common carriages mounted on the associated shelving supports. This common support simplifies the construction and also the drive and control means.

BRIEF DESCRIPTION OF THE DRAWING

The sole FIGURE is a schematic side elevation of a preferred embodiment of the storage and supply apparatus according to the invention.

DESCRIPTION OF THE PREFERRED EMBODIMENTS

As shown in the sole FIGURE, a plurality of shelving units 1 through 4 are arranged side by side in a row and spaced from one another. The shelving units include a plurality of carrier arms 5 located on like sides of the shelving units and forming a plurality of shelving compartments, one above the other. The shelving units are spaced from one another such that a shelving gangway exists between the ends of carrier arms 5 and an adjoining shelving unit. The right shelving unit 4 is obliquely oriented which proves advantageous when the shelving unit 4 stores materials which will be worked only once and then replaced by other materials. Depositing material on such an oblique shelving unit is easier and the unit holds the material more securely.

A moveable portal crane (not shown) extends above the shelving units in an orientation perpendicular to the plane of the drawing and is displaceable parallel thereto with vertical supports running on rails situated in front of and behind the shelving units as viewed in the drawing. The portal crane has a crane bridge 6 which is moveable into the shelving gangways and also into the shelving compartments. The crane bridge 6 carries on its under side, several fork prongs 7 in alignment one behind the other. The support edges of fork prongs 7 for supporting the material are inclined downwards away from the crane bridge 6 and include at the free end a peg 9 for the abutment of the material.

In the shelving unit 3 a first rollway 10 is moveable vertically by means of carriages 11 (only one is visible). The first rollway 10 is inclined slightly downwards and to the left so that the material 12 situated thereon can come into abutment on vertical guide rollers 13.

A second rollway 14 is likewise carried by the carriages 11, above the first rollway 10 at a distance corresponding to the interval of the shelving compartments in the shelving units 1 to 4. As was the case with the first rollway 10, abutment rollers 15 are provided against which the material 16 comes to abut by reason of the oblique position of the second rollway 14.

The second rollway 14 is shown in the sole FIGURE in the height position corresponding to the feed of the material 16 to a cutting machine C shown schematically behind the shelving unit 3. Above this position—as may be seen from the illustration in dot-and-dash lines in the drawing—a further position corresponding to a shelving compartment is left free to provide space for receiving the second rollway 14 which is moved vertically when the first rollway 10 is brought into the position to feed material lying on rollway 10 to the cutting machine C.

With the unit as thus described, the change of material for the cutting machine C takes place as follows:

Referring to the sole FIGURE of the drawing, a length of material 16 is assumed to have been returned from the cutting machine C to the second rollway 14 which is situated at the feeding height of the cutting machine C, that is in a "cutting machine loading position." Now material 12 is to be worked on next by the cutting machine C. Material 12 was earlier deposited by means of the crane bridge 6, 7, 9 on the first rollway 10, as the latter dwells in a lower "supplying position" underneath the cutting machine loading position occupied by the second rollway 14. The unit formed of the rollways 10, 14 together with the carriages 11 is then shifted upwards into the position illustrated in dot-and-dash lines, whereby the first rollway 10 assumes the cutting machine loading position, so that the material 12 is ready for delivery with the aid of the first rollway 10 to the cutting machine C. The second rollway 14 in turn, with the material 16 is now lifted into the dot-and-dash position into an upper "supplying position" above the cutting machine loading position, so that the material 16 can be brought back to its assigned shelving compartment. For this purpose the crane bridge 6, 7, 9 is moved upwards and to the left proceeding from the position as illustrated in the drawing, in order to take up the material 16 and bring it into the allocated shelving compartment. Then the crane fetches the material to be worked on next, in order to lay it onto rollway 14 as it dwells in the upper supplying position as illustrated in dot-and-dash lines. Then, by lowering the unit of rollways 10, 14, the rollway 14 can again be brought into the position for supplying the cutting machine C. The worked material is again taken from the first rollway 10 and can be replaced by the material to be worked on next.

Thus apart from the ordinary crane movements the material change requires only a reciprocating vertical movement of the unit of rollways 10, 14 together with their carriages 11, without further space requirements, especially transversely of the vertical direction. Moreover no more unnecessary crane travel or lifting movements are necessary, so that the material change times are reduced to the shortest conceivable extent.

It is noted that the mechanism for raising or lowering the carriages 11 may be any suitable power drive or hoisting device. Similarly, any suitable motion control may find application, including a computer-controlled synchronization of the motions of carriage and crane bridge.

It will be understood that the above description of the present invention is susceptible to various modifications, changes and adaptations and the same are intended to be comprehended within the meaning and range of equivalents of the appended claims.

What is claimed is:

1. An apparatus for storing and supplying rod-shaped material to a cutting machine comprising a shelving unit including a plurality of carrier arms arranged one above another to form shelving compartments for holding rod-shaped material; each shelving compartment extending horizontally in a length dimension of said shelving unit; a crane bridge moveable with respect to said shelving unit for removing rod-shaped material from and placing rod-shaped material into said shelving compartments, wherein the improvement comprises first and second rollways each forming a substantially horizontal support for carrying rod-shaped material thereon; said first and second rollways extending horizontally parallel to said length dimension and being vertically spaced from one another; and vertically displaceable means carrying said first and second rollways; said vertically displaceable means having a first position in which said first rollway assumes a cutting machine loading position for delivering rod-shaped material length-wise to and receiving unused rod-shaped material length-wise from a cutting machine; in said first position of said carrying means said second rollway assumes a first supplying position situated above said cutting machine loading position for cooperating with said crane bridge whereby rod-shaped material is deposited on said second rollway or is taken therefrom by said crane bridge; said vertically displaceable means having, underneath said first position, a second position in which said second rollway assumes said cutting machine loading position and said first rollway assumes a second supplying position situated underneath said cutting machine loading position for cooperating with said crane bridge whereby rod-shaped material is deposited on said first rollway or is taken therefrom by said crane bridge.

2. The apparatus of claim 1 wherein said shelving unit includes a shelving support; and wherein said vertically displaceable means comprises a common carriage guided by said shelving support.

3. The apparatus of claim 1 wherein said shelving unit includes a shelving support and said first and second rollways are inclined slightly downwards toward the shelving support and further comprising abutment rollers rotatable about a vertical axis and positioned adjacent said shelving support.

4. The apparatus of claim 1, wherein said first and second rollways are vertically spaced from the shelving compartments of said shelving unit.

* * * * *